(12) United States Patent
Ishii et al.

(10) Patent No.: US 8,249,009 B2
(45) Date of Patent: Aug. 21, 2012

(54) USER EQUIPMENT TERMINAL, BASE STATION APPARATUS, AND COMMUNICATION CONTROL METHOD IN MOBILE COMMUNICATION SYSTEM

(75) Inventors: Hiroyuki Ishii, Yokosuka (JP); Nobuhiko Miki, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 162 days.

(21) Appl. No.: 12/598,164

(22) PCT Filed: Apr. 21, 2008

(86) PCT No.: PCT/JP2008/057680
§ 371 (c)(1), (2), (4) Date: Jan. 7, 2010

(87) PCT Pub. No.: WO2008/136294
PCT Pub. Date: Nov. 13, 2008

(65) Prior Publication Data
US 2010/0135208 A1    Jun. 3, 2010

(30) Foreign Application Priority Data

May 1, 2007  (JP) .................................. 2007-121300

(51) Int. Cl.
*H04W 4/00* (2009.01)
(52) U.S. Cl. ...................................................... 370/329
(58) Field of Classification Search ........................ None
See application file for complete search history.

(56) References Cited

U.S. PATENT DOCUMENTS

| | | | |
|---|---|---|---|
| 6,983,147 B1 * | 1/2006 | Hans et al. ..................... | 455/436 |
| 7,245,636 B1 * | 7/2007 | Hans et al. ..................... | 370/474 |
| 2002/0082051 A1 * | 6/2002 | Tangorra et al. ............... | 455/561 |
| 2004/0009770 A1 * | 1/2004 | Sivanandan et al. .......... | 455/425 |
| 2006/0092960 A1 * | 5/2006 | Lee et al. ....................... | 370/412 |

FOREIGN PATENT DOCUMENTS

| | | |
|---|---|---|
| CN | 1809217 A | 7/2006 |
| EP | 1 906 689 A1 | 4/2008 |
| JP | 2003-143654 A | 5/2003 |

(Continued)

OTHER PUBLICATIONS

International Search Report w/translation from PCT/JP2008/057680 dated Jul. 29, 2008 (4 pages).

(Continued)

*Primary Examiner* — Raj Jain
(74) *Attorney, Agent, or Firm* — Osha Liang LLP

(57) ABSTRACT

A user equipment terminal capable of communicating with a base station apparatus in a mobile communication system includes a transmitting unit configured to transmit to the base station apparatus a first signal concerning a capability of the user equipment terminal; a receiving unit configured to receive from the base station apparatus a second signal concerning the capability of the user equipment terminal; and a communication processing unit configured to perform communication processing based on the capability of the user equipment terminal specified in the second signal. A base station apparatus capable of communicating with a user equipment terminal in a mobile communication system includes a receiving unit configured to receive from the user equipment terminal the first signal concerning the capability of the user equipment terminal; a transmitting unit configured to transmit to the user equipment terminal the second signal concerning the capability of the user equipment terminal; and a communication processing unit configured to perform communication processing based on the capability of the user equipment terminal specified in the second signal.

10 Claims, 11 Drawing Sheets

FOREIGN PATENT DOCUMENTS

| | | |
|---|---|---|
| JP | 2004-193676 A | 7/2004 |
| JP | 2006-345251 A | 12/2006 |
| WO | 2007/023809 A1 | 3/2007 |

OTHER PUBLICATIONS

Written Opinion from PCT/JP2008/057680 dated Jul. 29, 2008 (3 pages).

Patent Abstracts of Japan; Publication No. 2006-345251 dated Dec. 21, 2006; Koycera Corp. (1 page).

Patent Abstracts of Japan; Publication No. 2004-193676 dated Jul. 8, 2004; NTT DoCoMo Inc. (1 page).

Patent Abstracts of Japan; Publication No. 2003-143654 dated May 16, 2003; NTT DoCoMo Inc. (1 page).

3GPP TR 25.814 V7.0.0; "Physical layer aspects for evolved Universal Terrestrial Radio Access (UTRA)"; Jun. 2006 (126 pages).

3GPP TS 25.306 V6.8.0; "UE Radio Access capabilities"; Mar. 2006 (33 pages).

3GPP TS 25.212 V6.9.0; "Multiplexing and channel coding (FDD)"; Sep. 2006 (84 pages).

3GPP TS 25.331 V6.11.0; "Radio Resource Control (RRC)"; Sep. 2006 (1247 pages).

Chinese Office Action for Application No. 200880022660.2, mailed on Jan. 30, 2012 (10 pages).

esp@cenet Patent Abstract for Chinese Publication No. 1809217, publication date Jul. 26, 2006. (1 page).

\* cited by examiner

FIG.1

| HS-DSCH CATEGORY | MAXIMUM NUMBER OF RECEIVABLE CODES | MINIMUM TTI RECEPTION INTERVAL | MAXIMUM TRANSPORT BLOCK SIZE | SOFT BUFFER SIZE |
|---|---|---|---|---|
| CATEGORY 1 | 5 | 3 | 7298 | 19200 |
| CATEGORY 2 | 5 | 3 | 7298 | 28800 |
| CATEGORY 3 | 5 | 2 | 7298 | 28800 |
| CATEGORY 4 | 5 | 2 | 7298 | 38400 |
| CATEGORY 5 | 5 | 1 | 7298 | 57600 |
| CATEGORY 6 | 5 | 1 | 7298 | 67200 |
| CATEGORY 7 | 10 | 1 | 14411 | 115200 |
| CATEGORY 8 | 10 | 1 | 14411 | 134400 |
| CATEGORY 9 | 15 | 1 | 20251 | 172800 |
| CATEGORY 10 | 15 | 1 | 27952 | 172800 |
| CATEGORY 11 | 5 | 2 | 3630 | 14400 |
| CATEGORY 12 | 5 | 1 | 3630 | 28800 |

FIG.5

| | MAXIMUM NUMBER OF RECEIVABLE RESOURCE BLOCKS | MAXIMUM NUMBER OF RECEIVABLE BITS IN ONE SUB-FRAME | SOFT BUFFER SIZE PER ONE PROCESS |
|---|---|---|---|
| CATEGORY 1 | 100 | 200000 | 300000 |
| CATEGORY 2 | 50 | 100000 | 150000 |

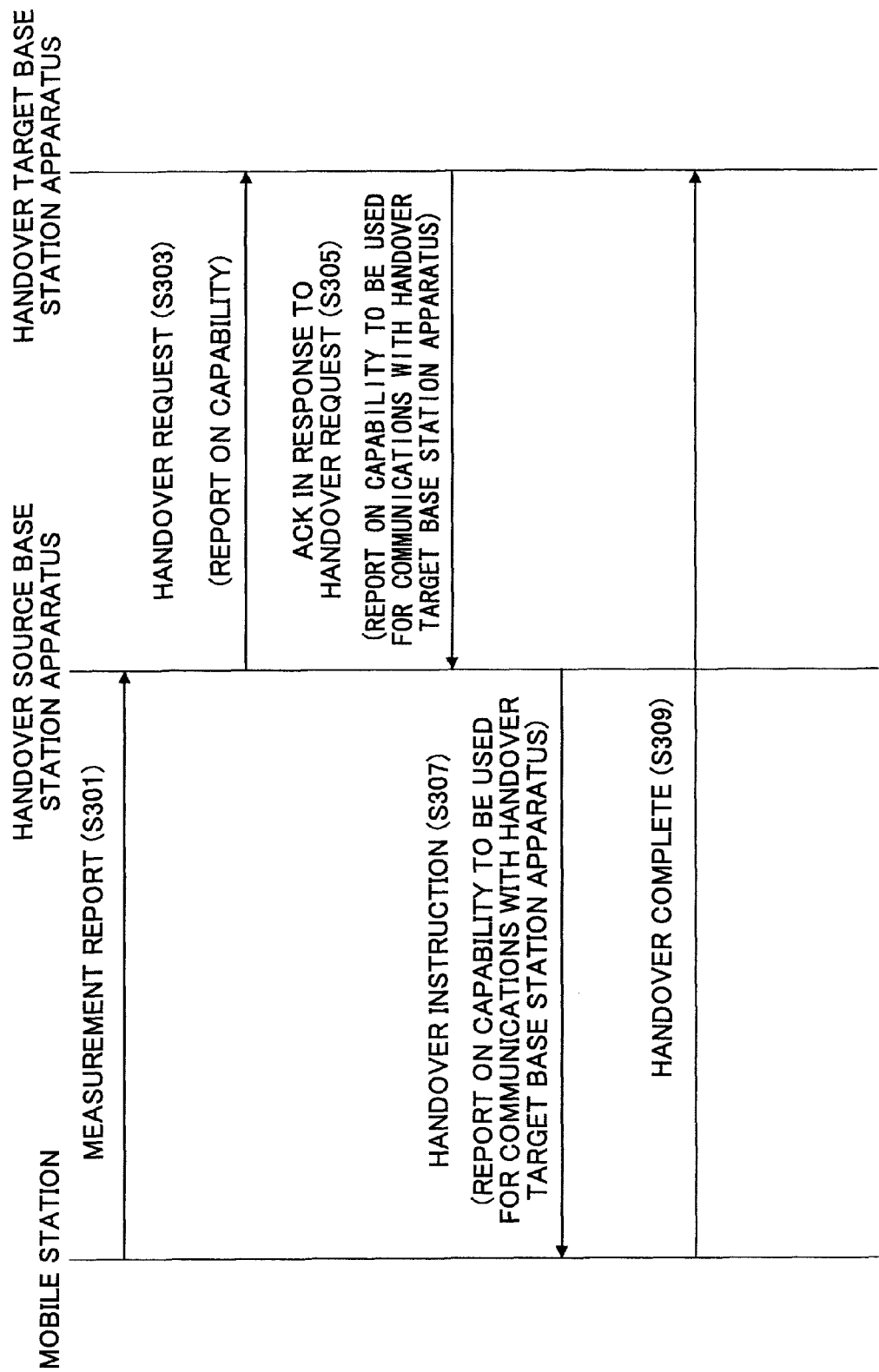

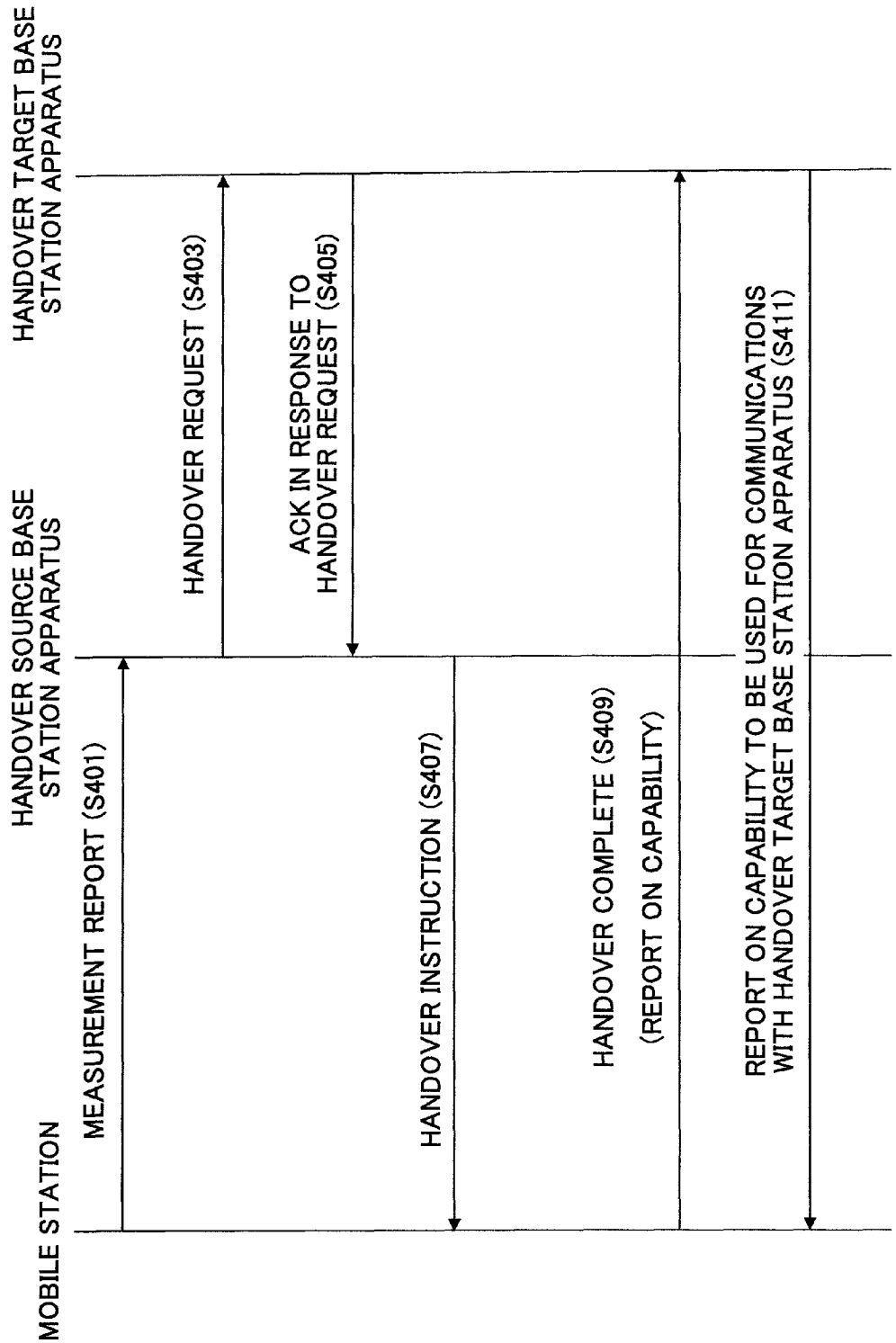

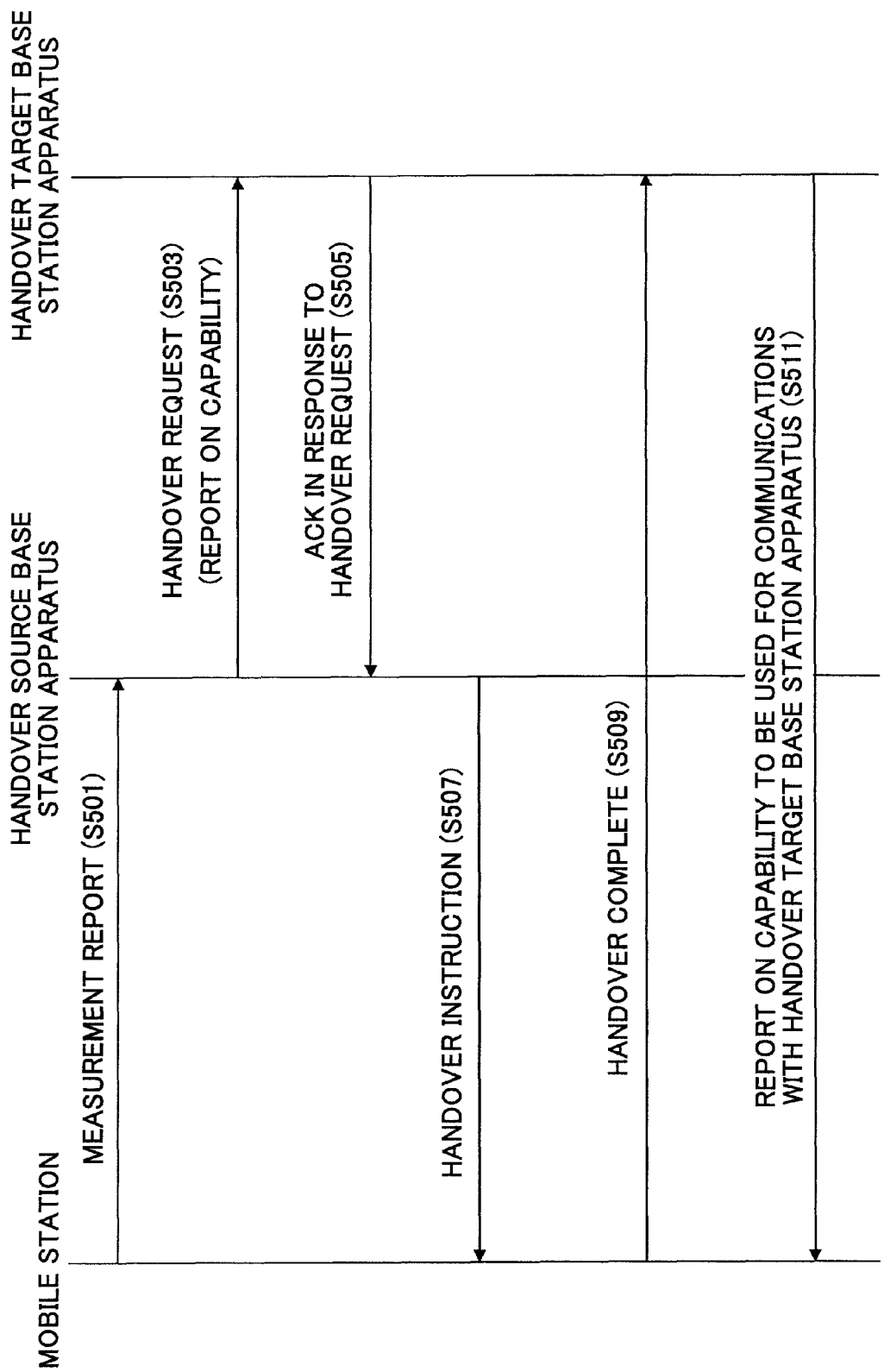

USER EQUIPMENT TERMINAL, BASE STATION APPARATUS, AND COMMUNICATION CONTROL METHOD IN MOBILE COMMUNICATION SYSTEM

TECHNICAL FIELD

The present invention relates to a field of mobile communications and specifically relates to a user equipment terminal, a base station apparatus, and a communication control method.

BACKGROUND ART

As a next-generation system of the W-CDMA (Wideband Code Division Multiple Access) and the HSDPA (High Speed Downlink Packet Access), an LTE (Long Term Evolution) system has been studied by 3GPP (3$^{rd}$ Generation Partnership Project) which is a standards body of the W-CDMA. In the LTE system as a radio access system, an OFDMA (Orthogonal Frequency Division Multiplexing Access) scheme and an SC-FDMA (Single-Carrier Frequency Division Multiple Access) scheme have been studied to be applied to downlink communications and uplink communications, respectively (see, 3GPP TR 25.814 (V7.0.0), "Physical Layer Aspects for Evolved UTRA", June 2006, for example).

The OFDMA scheme is a multi-carrier scheme in which a frequency band is divided into plural sub-carriers having narrower frequency bands and data are transmitted on the respective sub-carriers. The sub-carriers are closely arranged in the frequency direction, allowing the sub-carriers to be partly overlapped without causing interference, so that fast data transmission can be achieved and frequency usage efficiency can be improved.

The SC-FDMA scheme is a single-carrier scheme in which a frequency band is divided so that different frequencies can be separately used among plural terminals (user equipment terminals) and as a result, interference between terminals can be reduced. Further, in the SC-FDMA scheme, a range of transmission power fluctuation can be made smaller; therefore lower energy consumption of terminals can be achieved and a wider coverage area can be obtained.

Typically, the capabilities of mobile stations are defined in the mobile communication system. For example, as shown in FIG. 1, twelve types of capabilities (User Equipment capabilities or User Equipment categories) are defined in HSDPA (see 3GPP 25.306 V6.8.0 2006-03, Table 5.1a, for example). In HSDPA, a maximum number of receivable codes, a minimum TTI reception interval, a maximum transport block size, and a soft buffer size for an HS-DSCH (High Speed Downlink Shared Channel) are defined as the capabilities.

As used herein, the soft buffer size refers to an intermediate soft buffer size for 2-Stage Rate Matching in HARQ (Hybrid Automatic Repeat reQuest). The relationship between the 2-Stage Rate Matching and the soft buffer size is described below in detail. In HARQ, when signals are combined according to Incremental Redundancy, a buffer needs to be reserved for three signals (a Systematic bit, a Parity 1, and a Parity 2) for turbo coding. In this case, the size of the buffer (the memory size) to be reserved is three times larger than the size of actually received data, which presents a problem of increasing the workload in the mobile station. In order to solve the problem, 2-Stage Rate Matching is used. Specifically, the mobile station performs Rate Matching to a predetermined buffer size (First Rate Matching), and then performs further Rate Matching (Second Rate Matching) to generate bits to be mapped to the physical channel. The combination of signals according to Incremental Redundancy is made based on a bit sequence after First Rate Matching (see 3GPP 25.212 V6.9.0 2006-09, 4.5.4, for example). Since the mobile station may reserve the buffer size corresponding to the bit sequence after First Rate Matching, the buffer size (memory size) can be reduced.

The reason for defining the capabilities is described below. For example, HSDPA is a communication system which achieves a maximum transmission rate of 14 Mbps. When the capabilities are not defined, in other words, when only one capability is used, all the mobile stations must have the capability of the maximum transmission rate of 14 Mbps. On the other hand, the mobile communication system or the mobile communication service using the mobile communication system provides various mobile stations ranging from an expensive and high-performance mobile station to a low-cost and low-performance mobile station, in order to satisfy various user needs. Without the capabilities, the service may be degraded. Accordingly, the capabilities are defined in order to satisfy various user needs for the various mobile stations ranging from the expensive and high-performance mobile station to the low-cost and low-performance mobile station.

As shown in FIG. 2, for example, the capability is reported from the mobile station to the base station apparatus at the start of communications in HSDPA. Specifically, the mobile station transmits a connection request (RRC Connection Request) to the base station apparatus (S1) and the base station apparatus transmits a connection setup (RRC Connection Setup) to the mobile station (S3). Then, the capability (User Equipment radio access capability), which is one of information elements in a connection complete (RRC Connection Setup Complete) used for confirming establishment of the connection, is reported from the mobile station to the base station apparatus (S5). In this manner, the capability is specified from the mobile station to the base station apparatus (see 3GPP 25.331 V6.11.0 2006-09, 10.2.41, for example).

DISCLOSURE OF INVENTION

Problem(s) to be Solved by the Invention

However, the above-mentioned related art has following problems.

When 2-Stage Rate Matching is used, different bit sequences after rate matching are generated in mobile stations with different categories, even if these mobile stations receive the same original signal. More specifically, a bit sequence after rate matching in a mobile station with a category 6 may be different from that in a mobile station with a category 8. The category 6 corresponds to a maximum transmission rate of 3.6 Mbps and the category 8 corresponds to a maximum transmission rate of 7.2 Mbps.

In this case, the base station apparatus needs to communicate with the mobile station with the category 6 and the mobile station with the category 8 using different bit sequences. Typically, connection tests are carried out by a vendor who provides the apparatus and an operator who provides the mobile communication service, in order to achieve high-quality and stable communications. When mobile stations which generate different bit sequences, such as the mobile station with the category 6 and the mobile station with the category 8, are used, twice the number of connection tests are needed, which presents a problem of increasing the cost of the base station apparatus.

For example, when the base station apparatus supports communications with only the mobile station with the category 6, there is a problem in that the base station apparatus cannot communicate with the mobile station with the category 8. Since the category 8 is mightier than the category 6, the mobile station with the category 8 can operate with the category 6 in view of the capability structure. However, such an approach is not currently achieved, and thus the problem remains unsolved.

In view of these problems, it is a general object of the present invention to provide a user equipment terminal and a base station apparatus where the base station specifies (assigns) the capability for communications to the mobile station, thereby reducing connection tests in the base station apparatus and achieving flexible control of the capability.

Means for Solving the Problem(s)

In one aspect of the present invention, there is provided a user equipment terminal capable of communicating with a base station apparatus in a mobile communication system, including:

a transmitting unit configured to transmit to the base station apparatus a first signal concerning a capability of the user equipment terminal;

a receiving unit configured to receive from the base station apparatus a second signal concerning the capability of the user equipment terminal; and a communication processing unit configured to perform communication processing based on the capability of the user equipment terminal specified in the second signal.

In another aspect of the present invention, there is provided a base station apparatus capable of communicating with a user equipment terminal in a mobile communication system, including:

a receiving unit configured to receive from the user equipment terminal a first signal concerning a capability of the user equipment terminal;

a transmitting unit configured to transmit to the user equipment terminal a second signal concerning the capability of the user equipment terminal; and a communication processing unit configured to perform communication processing based on the capability of the user equipment terminal specified in the second signal.

In another aspect of the present invention, there is provided a communication control method in a user equipment terminal capable of communicating with a base station apparatus in a mobile communication system, including the steps of:

transmitting to the base station apparatus a first signal concerning a capability of the user equipment terminal;

receiving from the base station apparatus a second signal concerning the capability of the user equipment terminal; and performing communication processing based on the capability of the user equipment terminal specified in the second signal.

In another aspect of the present invention, there is provided a communication control method in a base station apparatus capable of communicating with a user equipment terminal in a mobile communication system, including the steps of:

receiving from the user equipment terminal a first signal concerning a capability of the user equipment terminal;

transmitting to the user equipment terminal a second signal concerning the capability of the user equipment terminal; and performing communication processing based on the capability of the user equipment terminal specified in the second signal.

ADVANTAGEOUS EFFECT OF THE INVENTION

According to an embodiment of the present invention, the base station can specify (assign) the capability for communications to the mobile station, thereby reducing connection tests in the base station apparatus and allowing the base station to support another mobile station whose capability is higher than that of the mobile station supported by the base station apparatus.

BRIEF DESCRIPTION OF THE DRAWINGS

FIG. 1 shows a table defining capabilities in HSDPA.

FIG. 5 shows exemplary downlink capabilities.

FIG. 9 shows a sequence diagram illustrating a communication control method according to a third embodiment of the present invention.

FIG. 10 shows a sequence diagram illustrating a communication control method according to a fourth embodiment of the present invention.

FIG. 11 shows a sequence diagram illustrating a communication control method according to a fifth embodiment of the present invention.

DETAILED DESCRIPTION OF THE PREFERRED EMBODIMENTS

Description of Notations

Figure 2:
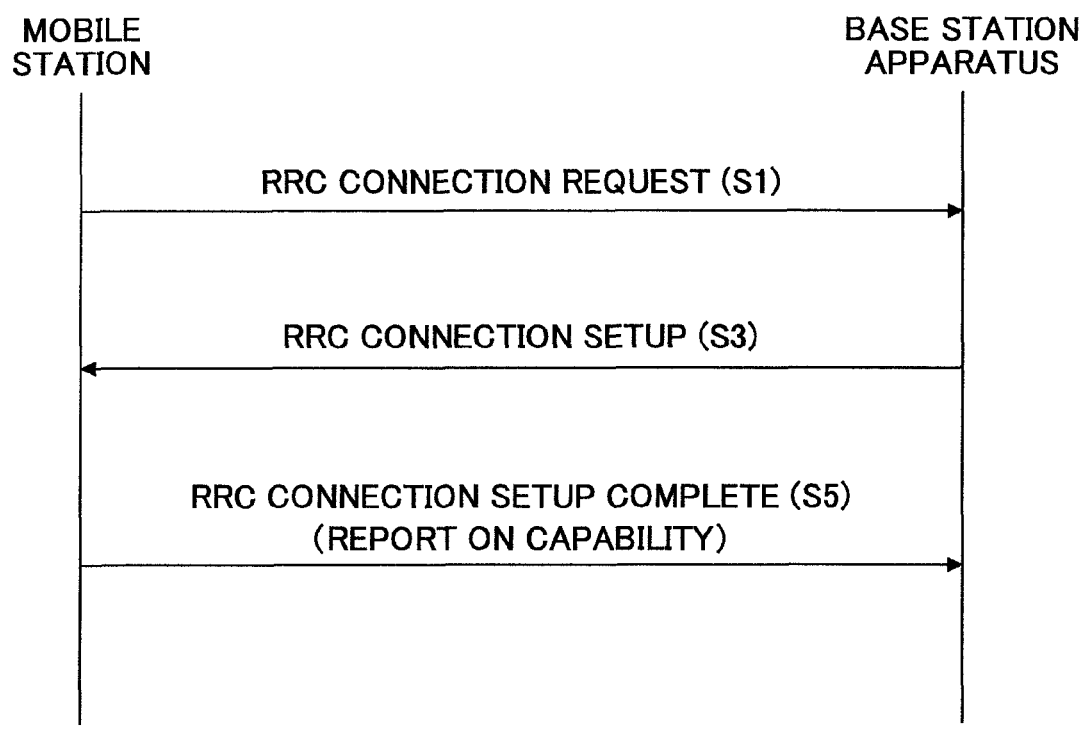
FIG. 2 shows a sequence diagram illustrating a method of reporting a capability in HSDPA.

50 cell
100$_1$, 100$_2$, 100$_3$, 100$_n$ mobile station
102 transceiving antenna
104 amplification unit
106 transceiving unit
108 baseband signal processing unit
110 call processing unit
112 application unit
114 capability control unit
200 base station apparatus
202 transceiving antenna
204 amplification unit
206 transceiving unit
208 baseband signal processing unit
210 call processing unit
212 transmission path interface
214 capability control unit
300 access gateway apparatus
400 core network

BEST MODE OF CARRYING OUT THE INVENTION

A best mode for carrying out the present invention is described below with reference to the accompanying drawings. Throughout the figures for illustrating the embodiments of the present invention, the same reference numerals are used for the same or equivalent elements and their repeated descriptions may be omitted.

First, a radio communication system including mobile stations and a base station apparatus according to an embodiment of the present invention is described with reference to FIG. 3.

Figure 3:
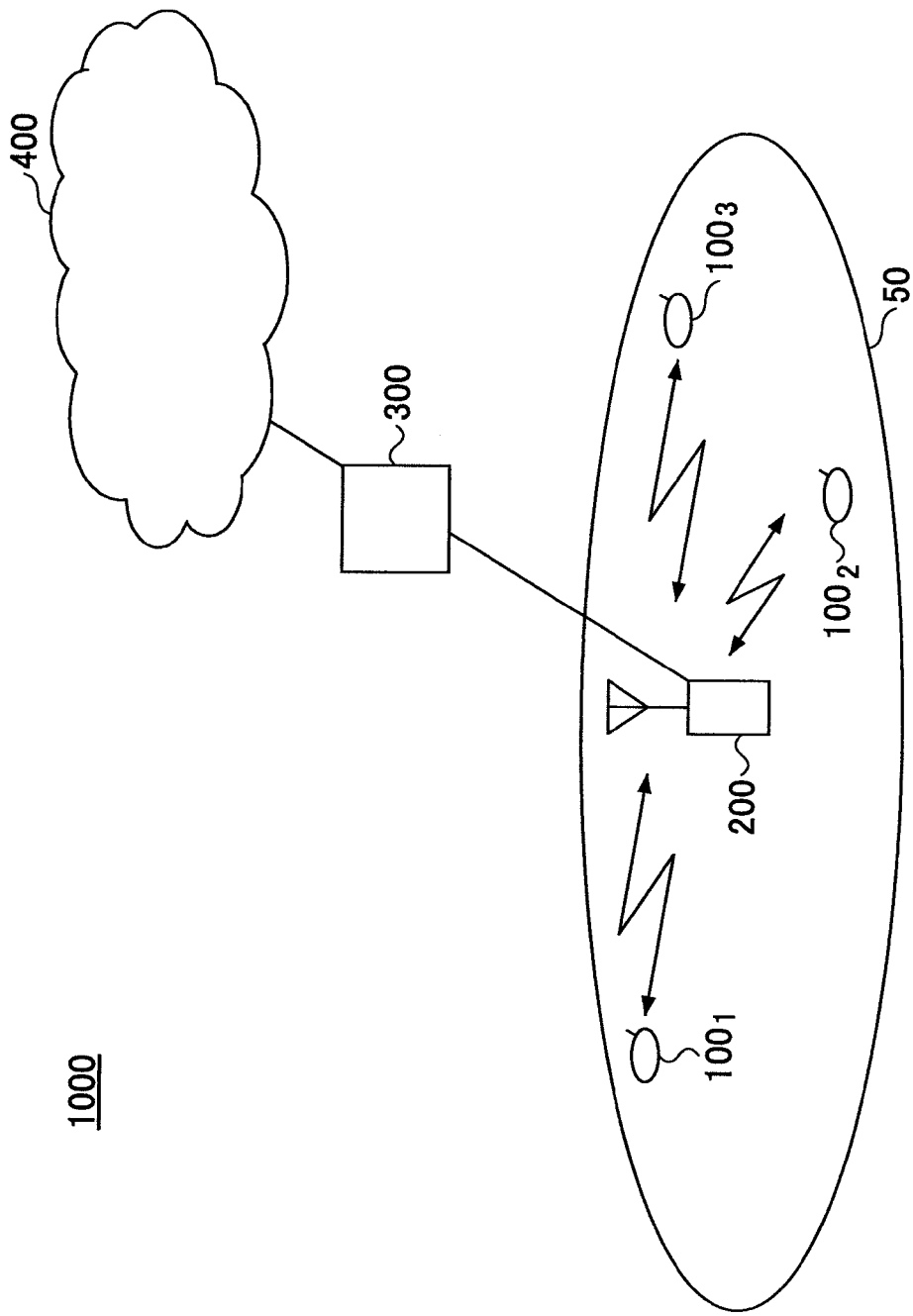
FIG. 3 shows a block diagram illustrating a configuration of a radio communication system according to an embodiment of the present invention.

As shown in FIG. 3, the radio communication system 1000, which may be an Evolved UTRA (Universal Terrestrial Radio Access) and UTRAN (UTRA Network) system (also as known as an LTE (Long Term Evolution) system or a super 3G system), includes a base station apparatus (eNB: eNodeB) 200 and plural mobile stations $100_n$ ($100_1$, $100_2$, $100_3$, ... $100_n$; n: an integer greater than zero) capable of communicating with the base station apparatus 200. The mobile station may be referred to as a user equipment terminal (UE: User Equipment). The base station apparatus 200 is connected to an upper node such as an access gateway apparatus 300. The access gateway apparatus 300 is connected to a core network 400. In this case, the mobile stations $100_n$ are in communication with the base station apparatus 200 in a cell 50 based on the Evolved UTRA and UTRAN radio communication scheme.

Each of the mobile stations ($100_1$, $100_2$, $100_3$, ... $100_n$) has the same configuration, functions, and status. Therefore, unless otherwise described, the term mobile stations $100_n$ may be collectively used in the following descriptions.

As the radio access scheme in the radio communication system 1000, the OFDMA (Orthogonal Frequency Division Multiplexing Access) scheme and the SC-FDMA (Single-Carrier Frequency Division Multiplexing Access) scheme are used in downlink and uplink communications, respectively. As described above, the OFDMA scheme is a multi-carrier transmission scheme in which a frequency band is divided into plural sub-carriers having narrow frequency bands and data are transmitted on the respective sub-carriers. The SC-FDMA scheme is a single-carrier transmission scheme in which a frequency band is divided so that different frequencies can be used among plural terminals and as a result, interference between terminals can be reduced.

Next, communication channels used in the Evolved UTRA and UTRAN system are described below.

In downlink communications, a Physical Downlink Shared Channel (PDSCH) that is shared among the mobile stations $100_n$ and an LTE Physical Downlink Control Channel (PDCCH) are used. In downlink, transport format information and user information of the user to which the Physical Downlink Shared Channel is transmitted, transport format information and user information of the user from which a Physical Uplink Shared Channel (PUSCH) is transmitted, acknowledge information of the PUSCH, and the like are reported via the LTE Physical Downlink Control Channel (PDCCH). User data are transmitted via the Physical Downlink Shared Channel. The user data are transmitted via a Downlink Shared Channel (DL-SCH) as a transport channel.

In uplink communications, the Physical Uplink Shared Channel (PUSCH) that is shared among the mobile stations $100_n$ and an LTE control channel are used. The LTE control channel has two types; one is to be time-multiplexed with the Physical Uplink Shared Channel (PUSCH) and the other is to be frequency-multiplexed with the Physical Uplink Shared Channel (PUSCH). The control channel to be frequency-multiplexed with the Physical Uplink Shared Channel (PUSCH) is called a Physical Uplink Control Channel (PUCCH). In uplink, a downlink Channel Quality Indicator (CQI) to be used for scheduling and Adaptive Modulation and Coding (AMC) for the Downlink Shared Channel (DL-SCH), and acknowledgement information of the Downlink Shared Channel (HARQ ACK information) are transmitted via the LTE Physical Uplink Control Channel (PUCCH). Further, user data are transmitted via the Physical Uplink Shared Channel (PUSCH). The user data are transmitted via an Uplink Shared Channel (UL-SCH) as a transport channel.

Figure 4:
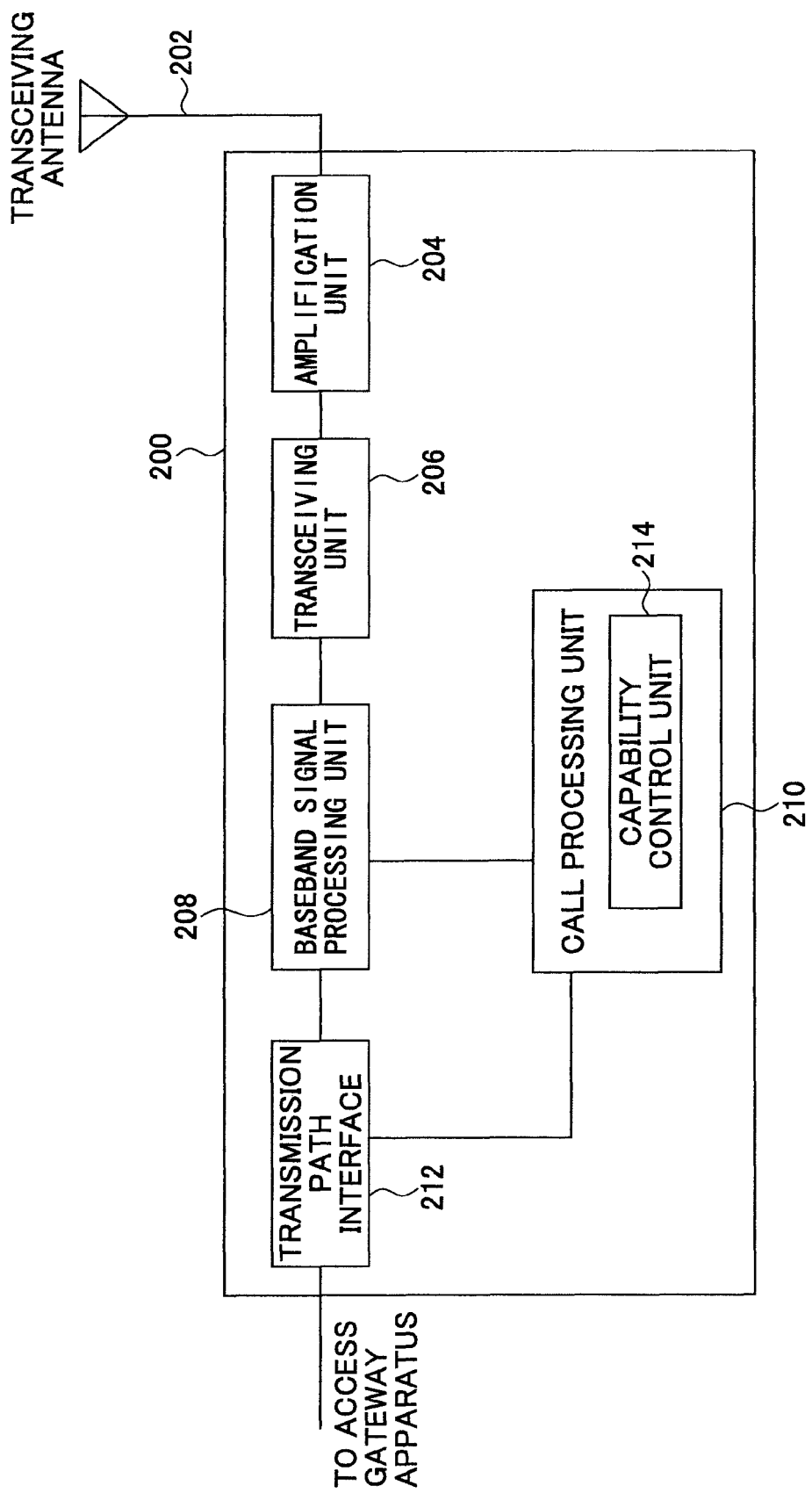
FIG. 4 shows a partial block diagram illustrating a base station apparatus according to an embodiment of the present invention.

Next, the base station apparatus 200 according to an embodiment of the present invention is described below with reference to FIG. 4.

The base station apparatus 200 according to this embodiment includes a transceiving antenna 202, an amplification unit 204, a transceiving unit 206, a baseband signal processing unit 208, a call processing unit 210, and a transmission path interface 212. The call processing unit 210 includes a capability control unit 214.

User data to be transmitted from the base station apparatus 200 to the mobile station $100_n$ through downlink are input to the baseband signal processing unit 208 from the upper node such as the access gateway apparatus 300 associated with the base station apparatus 200 via the transmission path interface 212.

In the baseband signal processing unit 208, downlink user data undergo segmentation/concatenation, Packet Data Convergence Protocol (PDCP) layer transmission processing, Radio Link Control (RLC) layer transmission processing such as RLC retransmission control, MAC retransmission control, for example, transmission processing of Hybrid Automatic Repeat request (HARQ), scheduling, transmission format selection, channel coding, and Inverse Fast Fourier Transform (IFFT) processing, and then are forwarded to the transceiving unit 206. In this embodiment, the baseband signal processing unit 208 performs transmission processing of the downlink user data in consideration of the capability of the mobile station $100_n$ supplied by the call processing unit 210.

For example, when the capability is a maximum receivable frequency resource for the mobile station $100_n$, the baseband signal processing unit 208 allocates frequency resources so that the frequency resource for the downlink shared channel to be transmitted to the mobile station $100_n$ is less than or equal to the maximum receivable frequency resource for the mobile station $100_n$. For example, the frequency resource may be a resource block or a resource block group. In LTE, one resource block corresponds to a frequency resource of 180 kHz. The resource block group refers to a group of one or more resource blocks.

For example, when the capability is a maximum receivable data size for the mobile station $100_n$, the baseband signal processing unit 208 determines the transmission format so that the data size for the downlink shared channel to be transmitted to the mobile station $100_n$ is smaller than or equal to the maximum receivable data size for the mobile station $100_n$. In other words, the baseband signal processing unit 208 transmits to the mobile station $100_n$ the downlink shared channel using the data size smaller than or equal to the maximum receivable data size for the mobile station $100_n$.

For example, when the capability is a soft buffer size in HARQ, the baseband signal processing unit 208 may perform 2-Stage Rate Matching for the downlink shared channel based on the soft buffer size in HARQ. In other words, the baseband signal processing unit 208 transmits to the mobile station $100_n$ the downlink shared channel for which 2-Stage Rate Matching is performed based on the soft buffer size in HARQ.

Additionally, in the baseband signal processing unit 208, signals on the downlink control channel (Physical Downlink Control Channel) also undergo transmission processing such as channel coding and Inverse Fast Fourier Transform processing, and then are forwarded to the transceiving unit 206.

Furthermore, an RRC message to be transmitted from the base station apparatus 200 to the mobile station $100_n$ is generated by the call processing unit 210 as described below. In the baseband signal processing unit 208, the RRC message undergoes RLC layer transmission processing, MAC retransmission control, scheduling, transmission format selection, channel coding, and Inverse Fast Fourier Transform processing, and then is forwarded to the transceiving unit 206.

In the transceiving unit 206, the baseband signal output from the baseband signal processing unit 208 undergoes frequency conversion processing for converting the baseband signal to a radio frequency signal, which is then amplified by the amplification unit 204 and transmitted from the transceiving antenna 202.

On the other hand, regarding data transmitted from the mobile station $100_n$ to the base station apparatus 200 in uplink, the radio frequency signal received by the transceiving antenna 202 is amplified by the amplification unit 204, frequency-converted into a baseband signal by the transceiving unit 206, and input to the baseband signal processing unit 208.

In the baseband signal processing unit 208, user data included in the input baseband signal undergo FFT (Fast Fourier Transform) processing, IDFT (Inverse Discrete Fourier Transform) processing, error correction decoding, reception processing for the MAC retransmission control, RLC layer reception processing, PDCP layer reception processing, and the like, and then are forwarded to the access gateway apparatus 300 via the transmission path interface 212.

The uplink data, i.e., user data transmitted via the uplink shared channel, are transmitted based on the transmission format determined by the baseband signal processing unit 208. Specifically, the mobile station $100_n$ transmits the uplink shared channel based on an uplink scheduling grant which is mapped to the downlink control channel. For example, the uplink scheduling grant includes uplink resource allocation information, an UE ID, a data size, a modulation scheme, uplink transmission power information, information about a Demodulation Reference Signal for uplink MIMO, and the like for the uplink shared channel. As described above for downlink communications, the baseband signal processing unit 208 generates the uplink scheduling grant in consideration of the capability of the mobile station $100_n$ supplied by the call processing unit 210.

For example, when the capability is a maximum transmittable frequency resource for the mobile station $100_n$, the baseband signal processing unit 208 allocates frequency resources so that the frequency resource for the uplink shared channel to be transmitted from the mobile station $100_n$ is less than or equal to the maximum transmittable frequency resource for the mobile station $100_n$. Information about the frequency resource is reported to the mobile station $100_n$ by means of the scheduling grant. For example, the frequency resource may be resource blocks or a resource block group. In LTE, one resource block corresponds to a frequency resource of 180 kHz. The resource block group refers to a group of one or more resource blocks.

For example, when the capability is a maximum transmittable data size for the mobile station $100_n$, the baseband signal processing unit 208 determines the transmission format so that the data size for the uplink shared channel to be transmitted from the mobile station $100_n$ is smaller than or equal to the maximum transmittable data size for the mobile station $100_n$. Information about the data size is reported to the mobile station $100_n$ by means of the scheduling grant.

Additionally, in the baseband signal processing unit 208, an RRC message transmitted from the mobile station $100_n$, which is included in the input baseband signal, undergoes FFT (Fast Fourier Transform) processing, IDFT (Inverse Discrete Fourier Transform) processing, error correction decoding, reception processing for the MAC retransmission control, RLC layer reception processing, and the like, and then is forwarded to the call processing unit 210.

The call processing unit 210 performs call processing such as establishment and release of communication channels, status management of the base station apparatus 200, and management of radio resources.

Additionally, the call processing unit 210 receives, via the baseband signal processing unit 208, an RRC message from the mobile station $100_n$. Information about the capability included in the RRC message is processed by the capability control unit 214 as follows.

The capability control unit 214 receives information about the capability of the mobile station $100_n$ at the start of communications with the mobile station $100_n$. For example, the capability may be a UE radio access capability, a physical channel capability, a PDSCH physical layer category, or the like. For example, the capability may be mapped to an RRC message such as a connection request (RRC Connection Request) or a connection complete (RRC Connection Complete).

After receiving the capability information, the capability control unit 214 generates an RRC message to report to the mobile station $100_n$ the capability to be used for actual communications. The capability control unit 214 may generate the RRC message using a format by means of which a mobile station with a minimum capability in the radio communication system can communicate, until the capability is settled (determined). More specifically, the capability control unit 214 and the baseband signal processing unit 208 may specify the transmission format by means of which the mobile station with the minimum capability can communicate, when it specifies the transmission format of the RRC message to be mapped to the uplink and downlink shared channels by means of the uplink scheduling grant and the downlink scheduling information. The transmission format may refer to a frequency resource to be used for communications such as resource block information, a modulation scheme, and a data size. As described above, the RRC message is transmitted to the mobile station $100_n$ via the baseband signal processing unit 208, the transceiving unit 206, the amplification unit 204, and the transceiving antenna 202.

The capability reported from the base station apparatus 200 (capability control unit 214) to the mobile station $100_n$ may be less than or equal to the capability reported from the mobile station $100_n$ to the base station apparatus 200.

More specifically, assuming that capabilities shown in FIG. 5 are defined, when the mobile station $100_n$ reports a category 1 to the base station apparatus 200, the base station apparatus 200 may report a category 2 to the mobile station $100_n$. In this manner, the mobile station $100_n$ reports to the base station apparatus 200 its maximum capability, and then the base station apparatus 200 reports to the mobile station $100_n$ the capability for the mobile station $100_n$ to be used for actual communications. It should be noted that the capabilities shown in FIG. 5 are for the illustrative purpose only. The number of categories is not limited to two, but may be any other value. In addition, the maximum number of receivable resource blocks, the maximum number of receivable bits in one sub-frame, and the soft buffer size per one process in terms of the capabilities are also for the illustrative purpose only, and other capabilities may be defined. Alternatively, a portion of these capabilities may be defined. For example, rather than the soft buffer size per one process, a soft buffer size for all processes may be defined.

As described above, the base station apparatus 200 exchanges information about the capability or capabilities with the mobile station $100_n$ at the start of communications, and determines the capability or capabilities for the mobile station $100_n$ to be used for actual communications. Alternatively, the base station apparatus 200 may exchange information about the capability or capabilities with the mobile station $100_n$ immediately after handover, and determine the capability or capabilities for the mobile station $100_n$ to be used for actual communications.

The information about the capabilities may be reported as a category, which is a group of plural capabilities as shown in FIGS. 1 and 5. Alternatively, information about the capabilities may be individually reported.

As described above, the base station apparatus 200 determines the capability based on the capability reported by the mobile station $100_n$, reports the determined capability to the mobile station $100_n$, and communicates with the mobile station $100_n$ based on the determined capability. According to this embodiment, it is possible to provide a user equipment terminal and a base station apparatus, where connection tests in the base station apparatus can be reduced and flexible control of the capability can be achieved. In addition, when a mobile station with a greater capability is developed, the base station apparatus can communicate with the mobile station with the greater capability.

Figure 6:
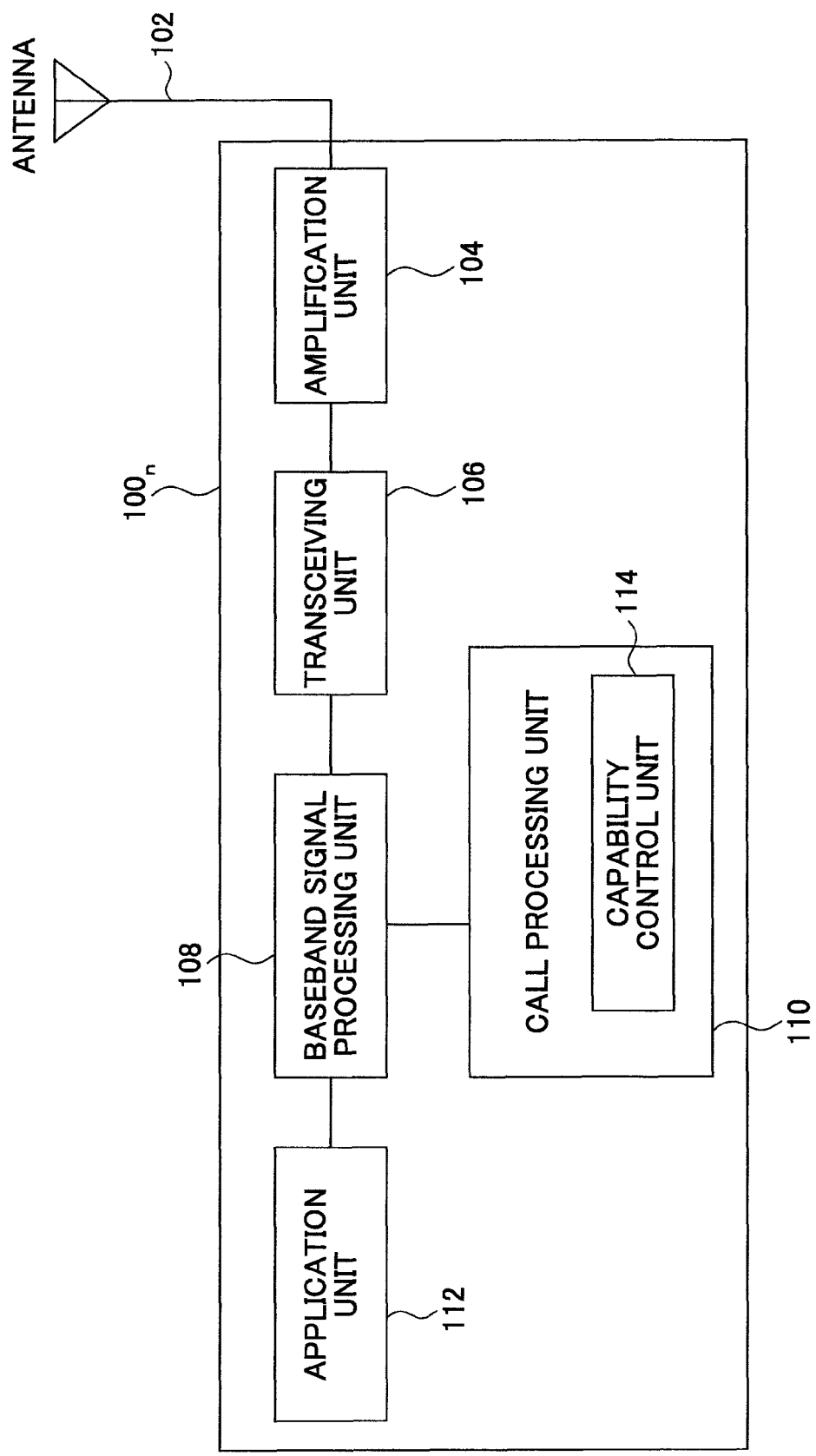
FIG. 6 shows a partial block diagram illustrating a mobile station according to an embodiment of the present invention.

Next, the mobile station $100_n$ according to an embodiment of the present invention is described below with reference to FIG. 6.

The mobile station $100_n$ includes a transceiving antenna 102, an amplification unit 104, a transceiving unit 106, a baseband signal processing unit 108, a call processing unit 110, and an application unit 112. The call processing unit 110 includes a capability control unit 114.

Regarding downlink data, a radio frequency signal received by the transceiving antenna 102 is amplified by the amplification unit 104, and frequency-converted into a baseband signal by the transceiving unit 106. The baseband signal undergoes FFT processing, error correction decoding, reception processing for the retransmission control, and so on in the baseband signal processing unit 108. In this embodiment, the baseband signal processing unit 108 performs reception processing of downlink user data in consideration of the capability supplied by the call processing unit 110. The downlink user data included in the downlink data are forwarded to the application unit 112. The application unit 112 performs processing on an upper layer higher than the physical layer and the MAC layer.

On the other hand, uplink user data are input from the application unit 112 to the baseband signal processing unit 108. In the baseband signal processing unit 108, the uplink user data undergo transmission processing for the retransmission control (HARQ), channel coding, Discrete Fourier Transform (DFT) processing, Inverse Fast Fourier Transform (IFFT) processing, and so on, and are forwarded to the transceiving unit 106. In this embodiment, the baseband signal processing unit 108 performs transmission processing of uplink user data in consideration of the capability supplied by the call processing unit 110. In the transceiving unit 106, the baseband signal output from the baseband signal processing unit 108 undergoes frequency conversion processing for converting the baseband signal to a radio frequency signal, which is then amplified by the amplification unit 104 and transmitted from the transceiving antenna 102.

The call processing unit 110 generates an RRC message to perform call processing such as establishment and release of communication channels. The capability control unit 114 in the call processing unit 110 processes information about the capability as follows.

The capability control unit 114 transmits information about the capability of the mobile station $100_n$ at the start of communications with the base station apparatus 200. For example, the capability may be mapped to an RRC message such as a connection request (RRC Connection Request) or a connection complete (RRC Connection Complete).

The capability control unit 114 receives from the base station apparatus 200 the capability to be used for actual communications in response to the RRC message such as the connection request or the connection complete. The mobile station $100_n$ transmits and receives user data in consideration of the capability received from the base station apparatus 200.

Figure 7:
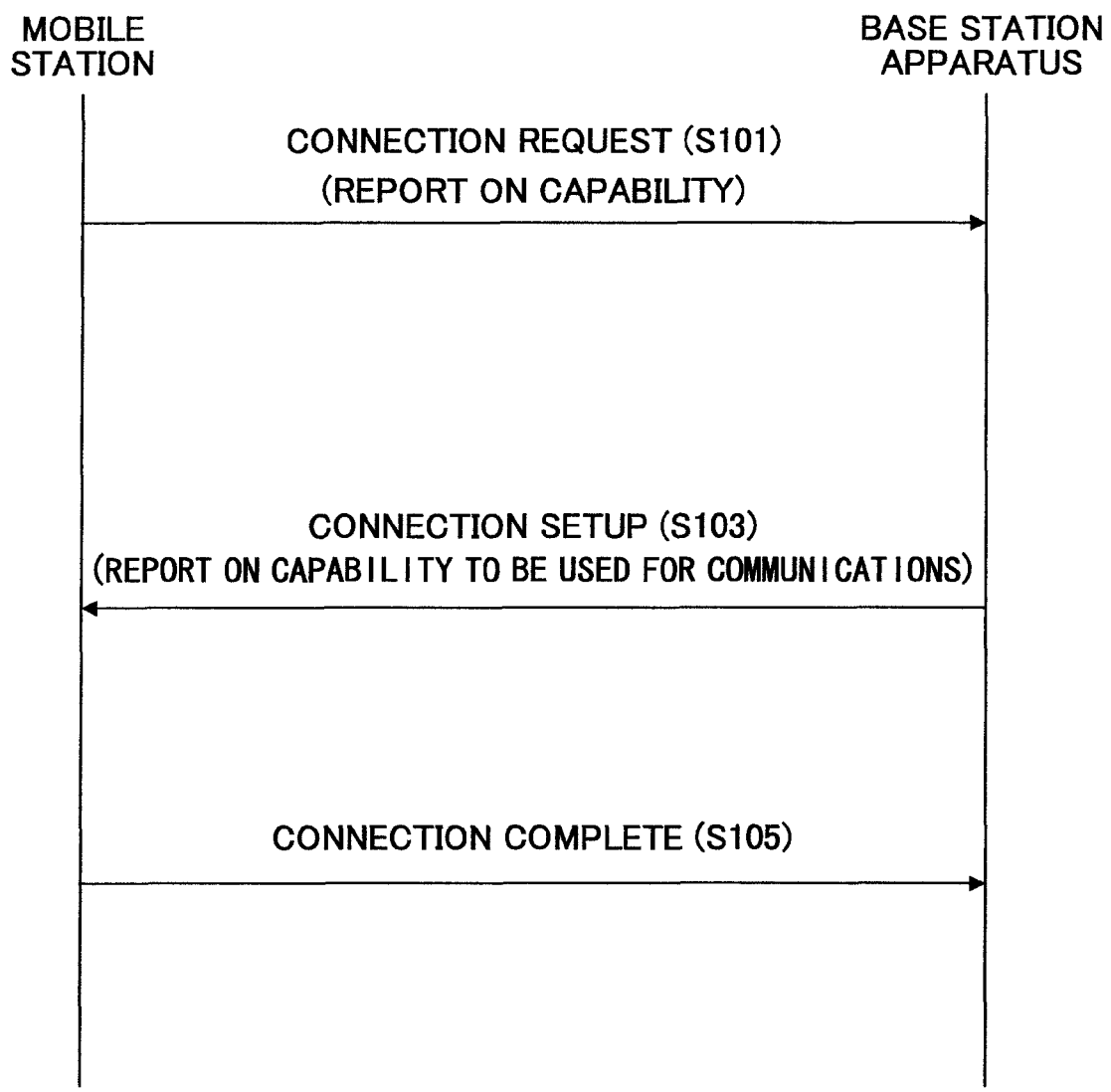
FIG. 7 shows a sequence diagram illustrating a communication control method according to a first embodiment of the present invention.

Next, a communication control method according to a first embodiment of the present invention is described below with reference to FIG. 7.

The mobile station transmits to the base station apparatus the capability of the mobile station as part of a connection request (RRC Connection Request) at the start of communications with the base station apparatus (S101). The base station apparatus sets up the connection and transmits to the mobile station a connection setup (RRC Connection Setup) in response to the connection request (S103). In this step, the base station apparatus reports to the mobile station the capability to be used for communications as part of the connection setup. Then, the mobile station transmits to the base station apparatus a connection complete (RRC Connection Setup Complete) to confirm establishment of the connection (S105). In this manner, the capability is transmitted and received as part of the connection request and the connection setup, thereby allowing the mobile station and the base station apparatus to communicate based on the capability reported by the base station apparatus.

Before the end of step S103, the capability to be used for communications is not settled (determined). In this case, the base station apparatus and the mobile station communicate using a transmission format by means of which a mobile station with a minimum capability in the radio communication system can communicate. More specifically, the base station apparatus may specify the transmission format by means of which the mobile station with the minimum capability can communicate, when it specifies the transmission format for the uplink and downlink shared channels by means of the uplink scheduling grant and the downlink scheduling information. The transmission format may refer to a frequency resource to be used for communications such as resource block information, a modulation scheme, and a data size.

Figure 8:
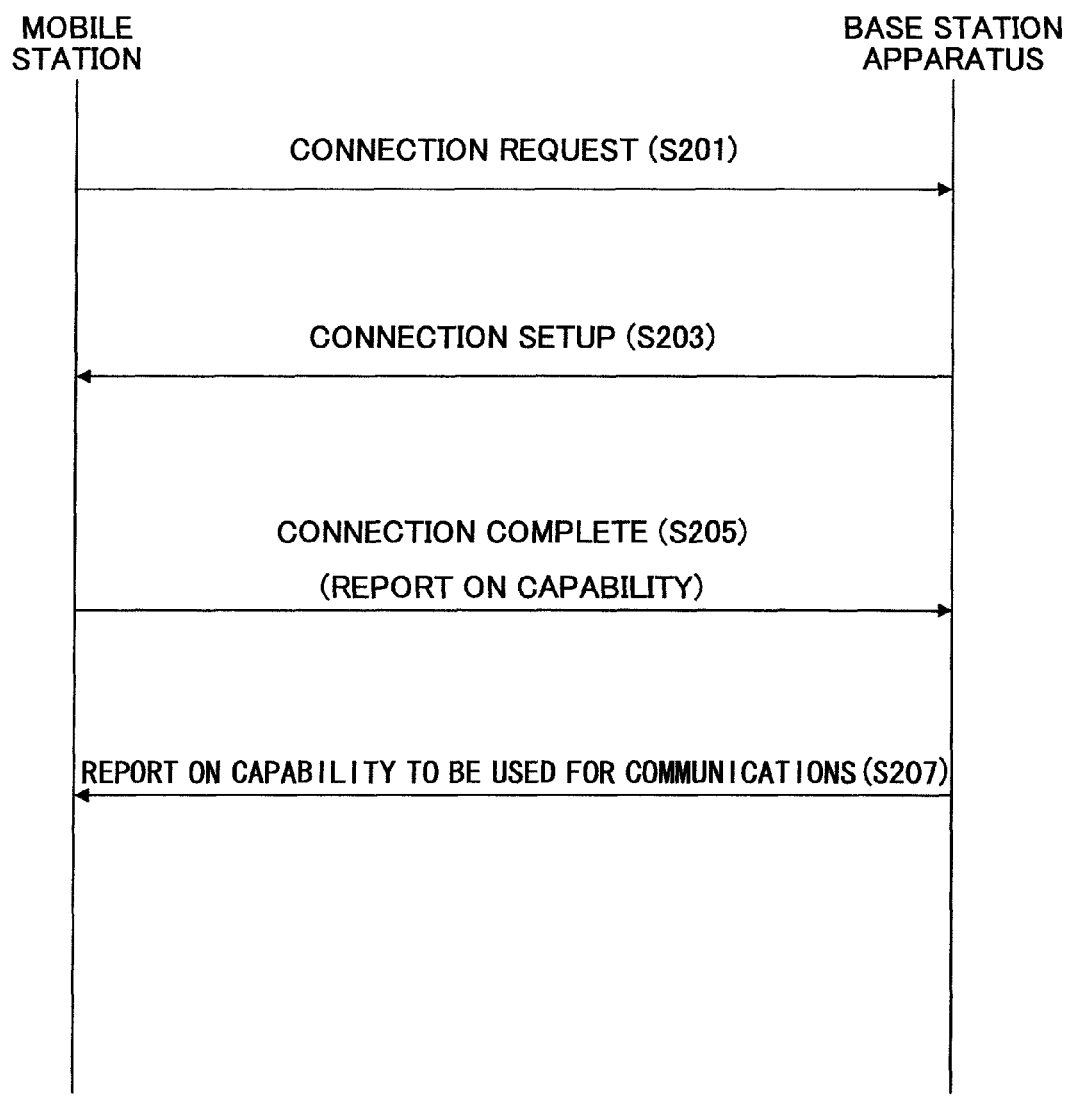
FIG. 8 shows a sequence diagram illustrating a communication control method according to a second embodiment of the present invention.

Next, a communication control method according to a second embodiment of the present invention is described below with reference to FIG. 8.

The mobile station transmits to the base station apparatus a connection request (RRC Connection Request) at the start of communications with the base station apparatus (S201). The base station apparatus sets up the connection and transmits to the mobile station a connection setup (RRC Connection Setup) in response to the connection request (S203). Then, the mobile station transmits to the base station apparatus a connection complete (RRC Connection Setup Complete) to confirm establishment of the connection (S205). In this step, the mobile station transmits to the base station apparatus the capability of the mobile station as part of the connection complete. The base station apparatus reports to the mobile station the capability to be used for communications in response to the connection complete. In this manner, the capability is transmitted and received as part of the connection complete and the response to the connection complete, thereby allowing the mobile station and the base station apparatus to communicate based on the capability reported by the base station apparatus.

Next, a communication control method according to a third embodiment of the present invention is described below with reference to FIG. 9.

The mobile station measures reception quality of neighboring cells during communications and reports the measurement result (measurement report) to the base station apparatus in communications with the mobile station (S301). More specifically, when the difference between reception quality of the handover target base station apparatus and reception quality of the handover source base station apparatus is above a predetermined level, the mobile station reports the measurement result (measurement report) for the notification of the best cell. When the base station apparatus in communications with the mobile station (handover source base station apparatus) receives the measurement result for the notification of the best cell and the best cell is different from its own cell, the base station apparatus (handover source base station apparatus) transmits a handover request to the handover target base station apparatus corresponding to the best cell (S303). The handover source base station apparatus transmits to the handover target base station apparatus, as part of the handover request, the capability which is initially reported from the mobile station to the handover source base station apparatus (for example, S103 in FIG. 7 or S205 in FIG. 8). Alternatively, the handover source base station apparatus may transmit to the handover target base station apparatus, as part of the handover request, the capability which is reported from the mobile station during communications with the handover source base station apparatus. The handover target base station apparatus transmits to the handover source base station apparatus, as part of a response to the handover request, the capability to be used for communications with the handover target base station apparatus (S305). The handover source base station apparatus transmits to the mobile station the capability to be used for communications with the handover target base station apparatus along with a handover instruction (S307). Handover is completed with the handover instruction (S309), thereby allowing the mobile station and the handover target base station apparatus to communicate based on the capability reported by the handover target base station apparatus.

Next, a communication control method according to a fourth embodiment of the present invention is described below with reference to FIG. 10.

The mobile station measures reception quality of neighboring cells during communications and reports the measurement result (measurement report) to the base station apparatus in communications with the mobile station (S401). More specifically, when the difference between reception quality of the handover target base station apparatus and reception quality of the handover source base station apparatus is above a predetermined level, the mobile station reports the measurement result (measurement report) for the notification of the best cell. When the base station apparatus in communications with the mobile station (handover source base station apparatus) receives the measurement result for the notification of the best cell and the best cell is different from its own cell, the base station apparatus (handover source base station apparatus) transmits a handover request to the handover target base station apparatus corresponding to the best cell (S403). The handover target base station apparatus transmits to the handover source base station apparatus a response to the handover request (S405). The handover source base station apparatus transmits to the mobile station a handover instruction (S407). With the handover instruction, the mobile station transmits a handover complete to the handover target base station apparatus (S409). In this step, the mobile station transmits the capability of the mobile station to the handover target base station apparatus. In response to the handover complete, the handover target base station apparatus transmits to the mobile station the capability to be used for communications with the handover target base station apparatus (S411), thereby allowing the mobile station and the handover target base station apparatus to communicate based on the capability reported by the handover target base station apparatus.

Next, a communication control method according to a fifth embodiment of the present invention is described below with reference to FIG. 11.

The mobile station measures reception quality of neighboring cells during communications and reports the measurement result (measurement report) to the base station apparatus in communications with the mobile station (S501). More specifically, when the difference between reception quality of the handover target base station apparatus and reception quality of the handover source base station apparatus is above a predetermined level, the mobile station reports the measurement result (measurement report) for the notification of the best cell. When the base station apparatus in communications with the mobile station (handover source base station apparatus) receives the measurement result for the notification of the best cell and the best cell is different from its own cell, the base station apparatus (handover source base station apparatus) transmits a handover request to the handover target base station apparatus corresponding to the best cell (S503). The handover source base station apparatus transmits to the handover target base station apparatus, as part of the handover request, the capability which is initially reported from the mobile station to the handover source base station apparatus (for example, S103 in FIG. 7 or S205 in FIG. 8). Alternatively, the handover source base station apparatus may transmit to the handover target base station apparatus, as part of the handover request, the capability which is reported from the mobile station during communications with the handover source base station apparatus. The handover target base station apparatus transmits to the handover source base station apparatus a response to the handover request (S505). The handover source base station apparatus transmits to the mobile station a handover instruction (S507). With the handover instruction, the mobile station transmits a handover complete to the handover target base station apparatus (S509). In response to the handover complete, the handover target base station apparatus transmits to the mobile station the capability to be used for communications with the handover target base station apparatus (S511), thereby allowing the mobile station and the handover target base station apparatus to communicate based on the capability reported by the handover target base station apparatus.

The handover shown in FIGS. 9, 10, and 11 may be handover between sectors within the base station apparatus (intra-cell handover) or handover between base station apparatuses (inter-cell handover). In the case of handover between sectors within the base station apparatus, the report on information about the capability may be omitted, since the mobile station communicates with the same base station apparatus.

Although the above-mentioned embodiments focus on the radio communication system, which may be an Evolved UTRA and UTRAN system (also as known as a Long Term Evolution system or a super 3G system), a mobile station, a base station apparatus, a mobile communication system, a communication control method according to an embodiment of the present invention may be used in any system in which a shared channel is used. For example, the present invention is applicable to a W-CDMA system or an HSDPA system under 3GPP.

This international application claims the benefit of the priority dates of Japanese Patent Application No. 2007-121300 filed on May 1, 2007, the entire content of which is herein incorporated hereby by reference.

The invention claimed is:

1. A user equipment terminal capable of communicating with a base station apparatus in a mobile communication system, comprising:
   a transmitting unit configured to transmit, to the base station apparatus, a first signal concerning a capability of the user equipment terminal;
   a receiving unit configured to receive, from the base station apparatus, a second signal concerning the capability of the user equipment terminal; and
   a communication processing unit configured to perform communication processing based on the capability of the user equipment terminal specified in the second signal, wherein
   the communication processing unit performs communication processing assuming that the capability of the user equipment terminal is at a minimum capability until the receiving unit receives the second signal concerning the capability of the user equipment terminal.

2. The user equipment terminal as claimed in claim 1, wherein:
   the capability of the user equipment terminal specified in the second signal is lower than or equal to the capability of the user equipment terminal specified in the first signal.

3. The user equipment terminal as claimed in claim 1, wherein:
   the capability of the user equipment terminal comprises a capability regarding reception on a downlink shared channel or a capability regarding transmission on an uplink shared channel.

4. The user equipment terminal as claimed in claim 3, wherein:
   the capability regarding reception on the downlink shared channel comprises at least one of a maximum receivable frequency resource, a maximum receivable data size, and a soft buffer size in HARQ for the shared channel.

5. A base station apparatus capable of communicating with a user equipment terminal in a mobile communication system, comprising:
   a receiving unit configured to receive from the user equipment terminal a first signal concerning a capability of the user equipment terminal;
   a transmitting unit configured to transmit to the user equipment terminal a second signal concerning the capability of the user equipment terminal; and
   a communication processing unit configured to perform communication processing based on the capability of the user equipment terminal specified in the second signal, wherein
   the communication processing unit performs communication processing assuming that the capability of the user equipment terminal is at a minimum capability until the transmitting unit transmits the second signal concerning the capability of the user equipment terminal.

6. The base station apparatus as claimed in claim 5, wherein:
   the capability of the user equipment terminal specified in the second signal is lower than or equal to the capability of the user equipment terminal specified in the first signal.

7. The base station apparatus as claimed in claim 5, wherein:
   the capability of the user equipment terminal comprises a capability regarding transmission on a downlink shared channel or a capability regarding reception on an uplink shared channel.

8. The user equipment terminal as claimed in claim 7, wherein:
   the capability regarding transmission on the downlink shared channel comprises at least one of a maximum receivable frequency resource, a maximum receivable data size, and a soft buffer size in HARQ for the shared channel.

9. A communication control method in a user equipment terminal capable of communicating with a base station apparatus in a mobile communication system, comprising the steps of:
   transmitting to the base station apparatus a first signal concerning a capability of the user equipment terminal;
   receiving from the base station apparatus a second signal concerning the capability of the user equipment terminal; and
   performing communication processing based on the capability of the user equipment terminal specified in the second signal, wherein the communication processing is performed assuming that the capability of the user equipment terminal is at a minimum capability until the second signal concerning the capability of the user equipment terminal is received.

10. A communication control method in a base station apparatus capable of communicating with a user equipment terminal in a mobile communication system, comprising the steps of:
    receiving from the user equipment terminal a first signal concerning a capability of the user equipment terminal;
    transmitting to the user equipment terminal a second signal concerning the capability of the user equipment terminal; and
    performing communication processing based on the capability of the user equipment terminal specified in the second signal, wherein the communication processing is performed assuming that the capability of the user equipment terminal is at a minimum capability until the receiving unit receives the second signal concerning the capability of the user equipment terminal.

* * * * *